US010367945B2

(12) United States Patent
Bostick et al.

(10) Patent No.: US 10,367,945 B2
(45) Date of Patent: *Jul. 30, 2019

(54) PERFORMING CONTEXTUAL ANALYSIS OF INCOMING TELEPHONE CALLS AND SUGGESTING FORWARDING PARTIES

(71) Applicant: INTERNATIONAL BUSINESS MACHINES CORPORATION, Armonk, NY (US)

(72) Inventors: James E. Bostick, Cedar Park, TX (US); John M. Ganci, Jr., Raleigh, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/059,297

(22) Filed: Aug. 9, 2018

(65) Prior Publication Data

US 2018/0352090 A1 Dec. 6, 2018

Related U.S. Application Data

(63) Continuation of application No. 15/463,305, filed on Mar. 20, 2017, now Pat. No. 10,079,939.

(51) Int. Cl.
*H04M 1/56* (2006.01)
*H04M 15/06* (2006.01)
(Continued)

(52) U.S. Cl.
CPC ..... *H04M 7/0033* (2013.01); *H04M 3/42068* (2013.01); *H04M 3/42348* (2013.01);
(Continued)

(58) Field of Classification Search
USPC .......................... 379/142.01, 142.06, 373.01
See application file for complete search history.

(56) References Cited

U.S. PATENT DOCUMENTS 6,650,746 B1   11/2003 Groen et al.
6,798,876 B1    9/2004 Bala
(Continued)

FOREIGN PATENT DOCUMENTS

EP          2945358        11/2015

OTHER PUBLICATIONS

Anonymous, "Method and System for Automatically Handling Incoming Calls based on Context of a Caller", Ip.com, Sep. 22, 2015, 3 pages.
(Continued)

*Primary Examiner* — Quoc D Tran
(74) *Attorney, Agent, or Firm* — Christopher McLane; Andrew D. Wright; Roberts Mlotkowski Safran Cole & Calderon, P.C.

(57) ABSTRACT

A computer-implemented method includes: receiving, by a computing device, an incoming telephone call from a caller; identifying, by the computing device, a telephone number associated with the telephone call; obtaining, by the computing device, contextual data based on the telephone number; predicting, by the computing device, one or more reasons for the telephone call based on the contextual data; and displaying, by the computing device, the one or more reasons for the telephone call.

20 Claims, 10 Drawing Sheets

(51) Int. Cl.
  *H04M 7/00*    (2006.01)
  *H04M 3/42*    (2006.01)
  *H04M 3/436*   (2006.01)
  *H04M 3/54*    (2006.01)

(52) U.S. Cl.
  CPC ........... *H04M 3/436* (2013.01); *H04M 3/543* (2013.01); *H04M 2203/551* (2013.01); *H04M 2203/556* (2013.01); *H04M 2242/16* (2013.01)

(56) References Cited

U.S. PATENT DOCUMENTS

| | | |
|---|---|---|
| 6,829,349 B1 | 12/2004 | Neale et al. |
| 7,023,979 B1 | 4/2006 | Wu et al. |
| 7,885,395 B2 | 2/2011 | Cadiz et al. |
| 8,374,628 B1 | 2/2013 | Nelissen et al. |
| 8,897,438 B2 | 11/2014 | Fakrenkopf et al. |
| 9,143,611 B2 | 9/2015 | Hartley et al. |
| 9,307,085 B1 | 4/2016 | Hanson et al. |
| 10,079,939 B1 * | 9/2018 | Bostick ............... H04M 7/0033 |
| 2007/0047726 A1 | 3/2007 | Jabbour et al. |
| 2007/0116220 A1 | 5/2007 | Eckel et al. |
| 2007/0237130 A1 | 10/2007 | Milstein et al. |
| 2009/0290693 A1 | 11/2009 | K N |
| 2011/0044442 A1 | 2/2011 | Abramson et al. |
| 2011/0208660 A1 | 8/2011 | Erbey et al. |
| 2012/0115449 A1 | 5/2012 | Bruchelt |
| 2014/0051381 A1 | 2/2014 | Ginter et al. |
| 2014/0065997 A1 | 3/2014 | Walker et al. |
| 2014/0113581 A1 | 4/2014 | Nassimi |
| 2014/0278640 A1 | 9/2014 | Galloway et al. |
| 2014/0286484 A1 | 9/2014 | Ehrlich et al. |

OTHER PUBLICATIONS

Mell et al., "The NIST Definition of Cloud Computing", NIST, Special Publication 800-145, Sep. 2011, 7 pages.

* cited by examiner

US 10,367,945 B2

PERFORMING CONTEXTUAL ANALYSIS OF INCOMING TELEPHONE CALLS AND SUGGESTING FORWARDING PARTIES

BACKGROUND

The present invention generally relates to performing contextual analysis of incoming telephone calls and, more particularly, to performing contextual analysis of incoming telephone calls to determine a purpose of the call and appropriate parties for which to forward the call.

Having knowledge of the purpose of an individual's call to a recipient can be helpful in preparing the recipient to answer the call. For example, in a customer support environment when a customer is calling a business or support center of a service provider for assistance, the service provider may attempt to identify a purpose of the call in order to forward the call to the appropriate party. Some techniques used to identify the purpose of the call include presenting the caller with a series of automated questions, using natural language processing techniques, etc.

SUMMARY

In an aspect of the invention, a computer-implemented method includes: receiving, by a computing device, an incoming telephone call from a caller; identifying, by the computing device, a telephone number associated with the telephone call; obtaining, by the computing device, contextual data based on the telephone number; predicting, by the computing device, one or more reasons for the telephone call based on the contextual data; and displaying, by the computing device, the one or more reasons for the telephone call.

In an aspect of the invention, there is a computer program product for providing a recipient of an incoming telephone call with advance notice regarding an urgency of the incoming telephone call. The computer program product comprising a computer readable storage medium having program instructions embodied therewith, the program instructions executable by a computing device to cause the computing device to: receive the incoming telephone call from a caller; identify a telephone number associated with the telephone call; obtain contextual data based on the telephone number; determine a level of urgency of the telephone call based on the contextual data; and display information regarding the level of urgency of the telephone call.

In an aspect of the invention, a system includes: a CPU, a computer readable memory and a computer readable storage medium associated with a computing device; program instructions to receive an incoming telephone call from a caller; program instructions to identify a telephone number associated with the telephone call; program instructions to obtain contextual data based on the telephone number, program instructions to determine one or more reasons for the telephone call based on the contextual data; program instructions to determine an urgency of the incoming telephone call; program instructions to determine a delegate; and program instructions to display the one or more reasons for the incoming telephone call, the urgency of the incoming telephone call, and an option to forward the incoming telephone call to the delegate. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
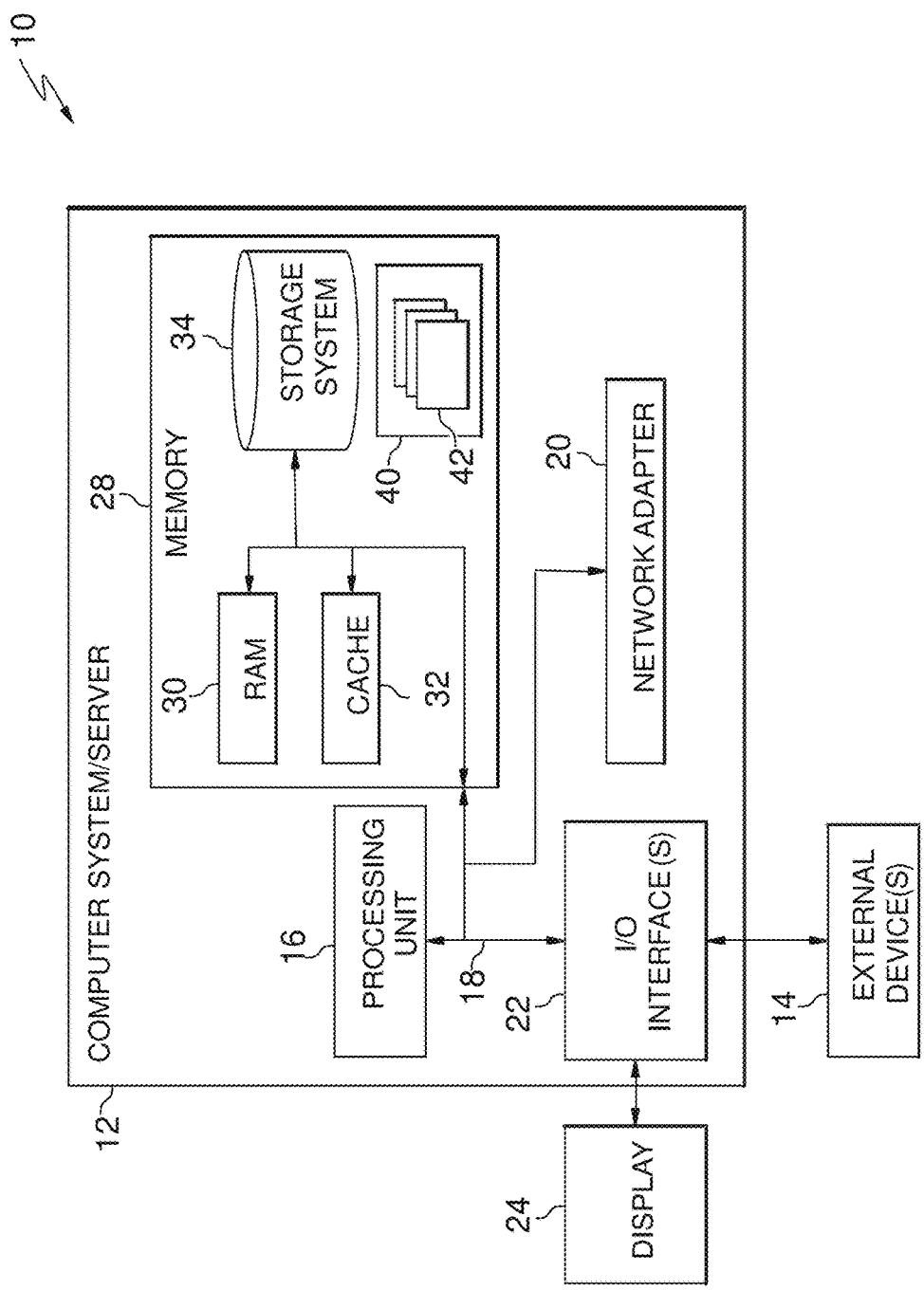
FIG. 1 depicts a cloud computing node according to an embodiment of the present invention.

The present invention generally relates to performing contextual analysis of incoming telephone calls and, more particularly, to performing contextual analysis of incoming telephone calls to determine a purpose of the call and appropriate parties for which to forward the call. Aspects of the present invention may include a contextual analysis telephone system that performs contextual analysis of an incoming phone call based on a telephone number associated with the incoming telephone call. As described herein, a contextual analysis telephone system may include a smart phone, desktop phone, and/or similar device having the capabilities of the present invention as described herein. Additionally, or alternatively, the contextual analysis telephone system may include a system within a call center that may route and forward calls in accordance with aspects of the present invention.

In embodiments, aspects of the present invention may use the telephone number of the incoming telephone call as a search query to one or more databases and external sources to predict the purpose of the caller's call. As an example, the contextual analysis telephone system may be implemented by a customer service provider. When a caller calls the customer service provider, the contextual analysis telephone system may search a database for the telephone number to identify a profile of the caller (e.g., name of the caller, prior reasons for the caller having called the customer service center, products registered to the caller, etc.). From the caller's profile, a reason for the call may be predicted (e.g., a prediction that the caller is calling to obtain technical assistance with a product). In turn, suggested parties to receive the call may be determined (e.g., in listed that is ranked in an order determined based on a scoring technique in which the most likely helpful party is listed first). In embodiments, the contextual analysis telephone system may present, on an associated display, the caller's information (e.g., telephone number, name), the predicted reason for the caller's call, and suggested parties for which to forward the call (e.g., a particular department or individual having expertise in the caller's purpose for the call). Further, the contextual analysis telephone system may present options for the recipient or operator to accept the call, or forward the call to a suggested party. Alternatively, the contextual analysis telephone system may automatically forward the call to a suggested party in the order in the list.

As further described herein, information from any number of sources may be obtained to predict a reason for the caller's call to the recipient. Based on the telephone number, the contextual analysis telephone system may identify an individual, and may search various, shared sources regarding that individual to predict the reason for the call. For example, the contextual analysis telephone system may search the user's social media page, a calendar shared with the recipient, e-mails/text conversations between the recipient and the individual, etc. Additionally, or alternatively, the contextual analysis telephone system may be a smart phone or similar device that obtains the caller's location based on a previously established relationship in which the caller has shared their location with the recipient (e.g., using a location sharing application or system).

As described herein, the contextual analysis telephone system may be a smart phone that identifies if the caller is located in an unexpected location in which case the purpose of the call may be identified as potentially urgent (e.g., with a message, icon, special ring-tone, etc.). Further, a potentially urgent call may trigger the contextual analysis telephone system to override notification profiles (e.g., a silent notification profile) and override volume settings to ensure that the potentially urgent call is given attention by the recipient.

Advantageously, aspects of the present invention utilize information across multiple data sources to predict the purpose of a call. In a customer-service environment, aspects of the present invention may better predict the purpose of the call to better service a caller (e.g., customer). In other environments (e.g., in a situation in which a parent receives a call from a child), aspects of the present invention may identify a call as potentially urgent (e.g., when a caller is in an unexpected location). As described herein, aspects of the present invention may assist a recipient of a call by providing the recipient with advance notice regarding a possible reason for the call and/or an urgency of the call.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
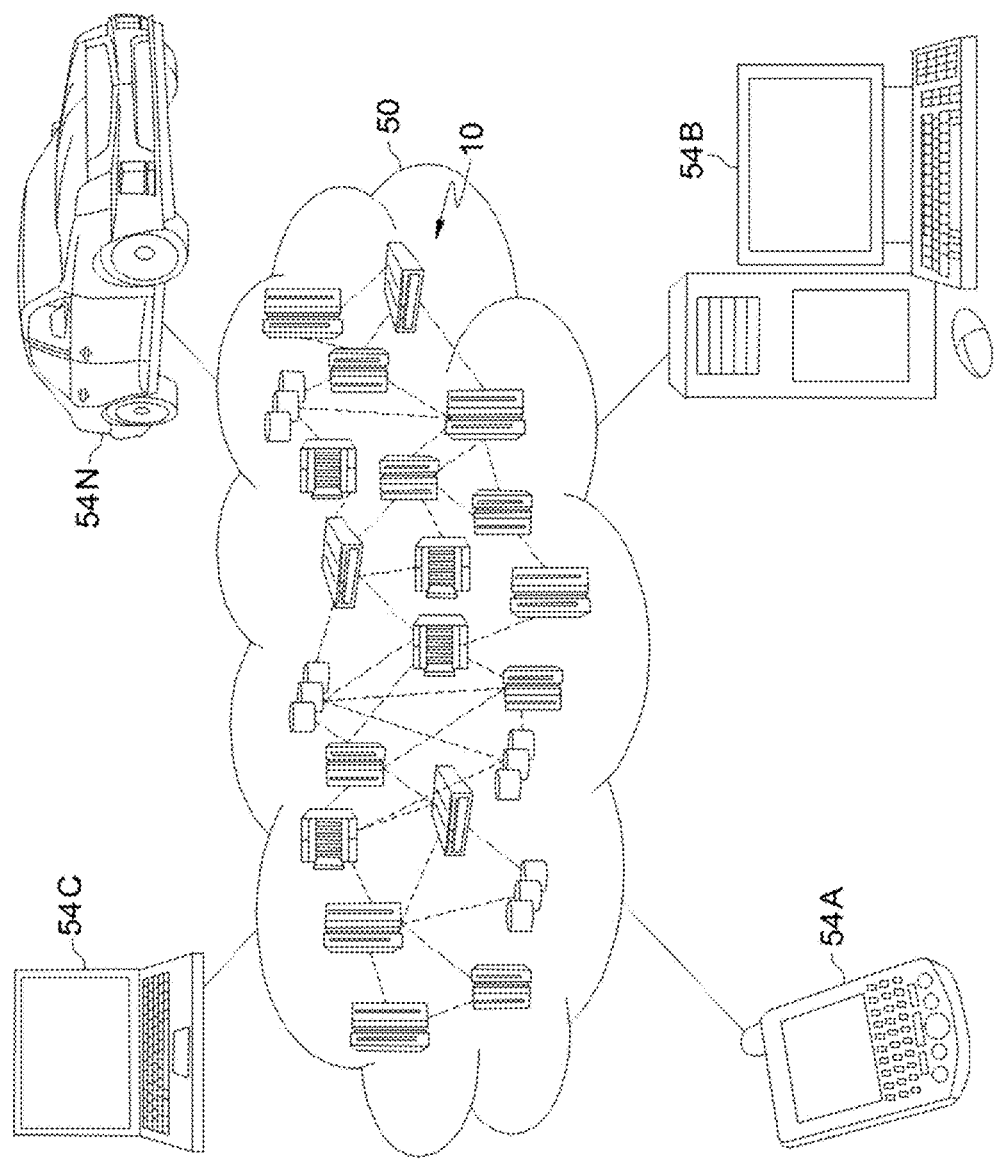
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
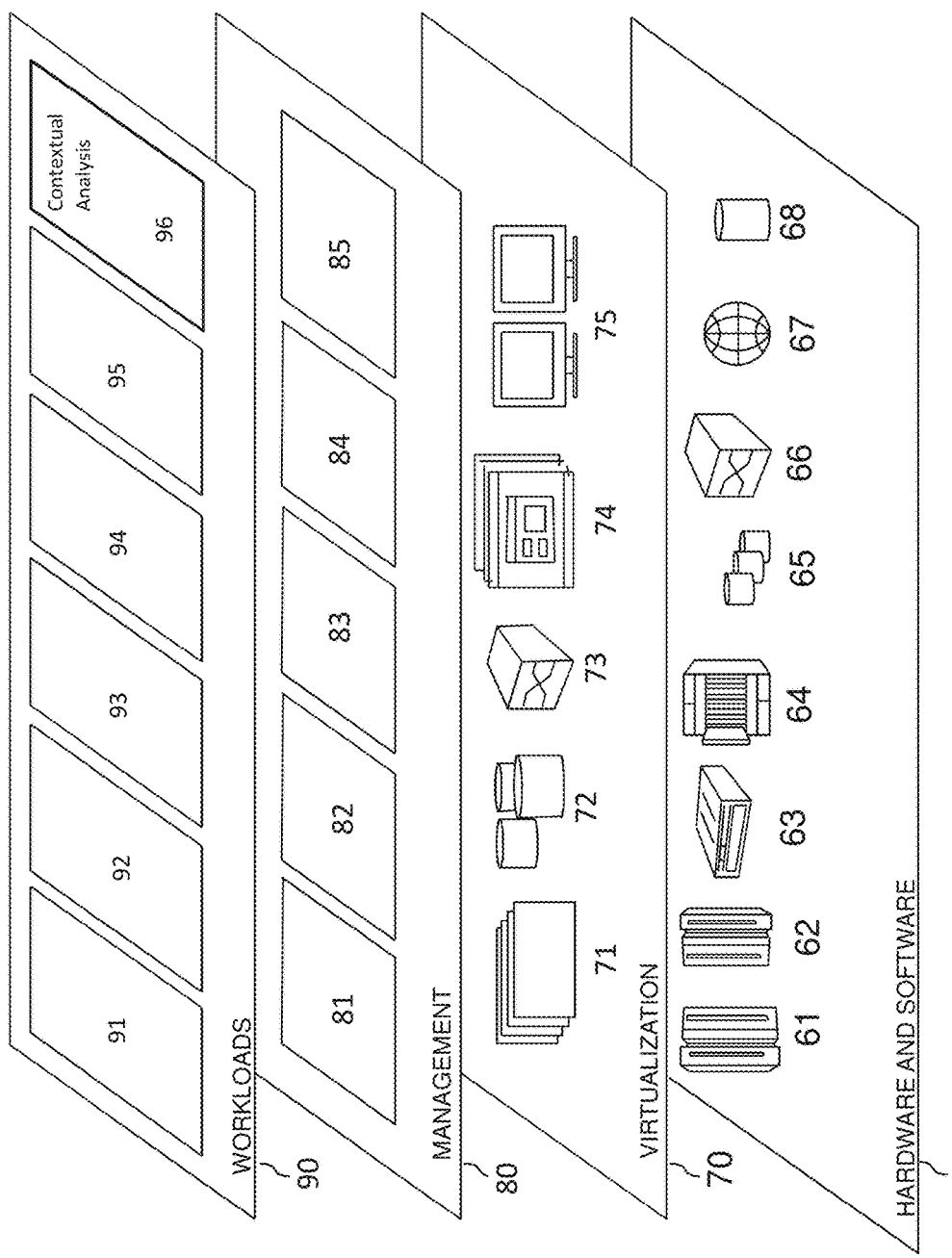
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextual analysis 96.

Referring back to FIG. 1, the program/utility 40 may include one or more program modules 42 that generally carry out the functions and/or methodologies of embodiments of the invention as described herein (e.g., such as the functionality provided by contextual analysis 96). Specifically, the program modules 42 may receive an incoming call, identify a telephone number associated with the call obtain contextual data based on the telephone number, determine call context relating to call purpose, determine delegates for call forwarding, display call context and options for call forwarding, receive as election to forward the call, and forward the call and the call context to selected forwarded delegate. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a contextual analysis telephone system as shown in FIG. 4.

Figure 4:
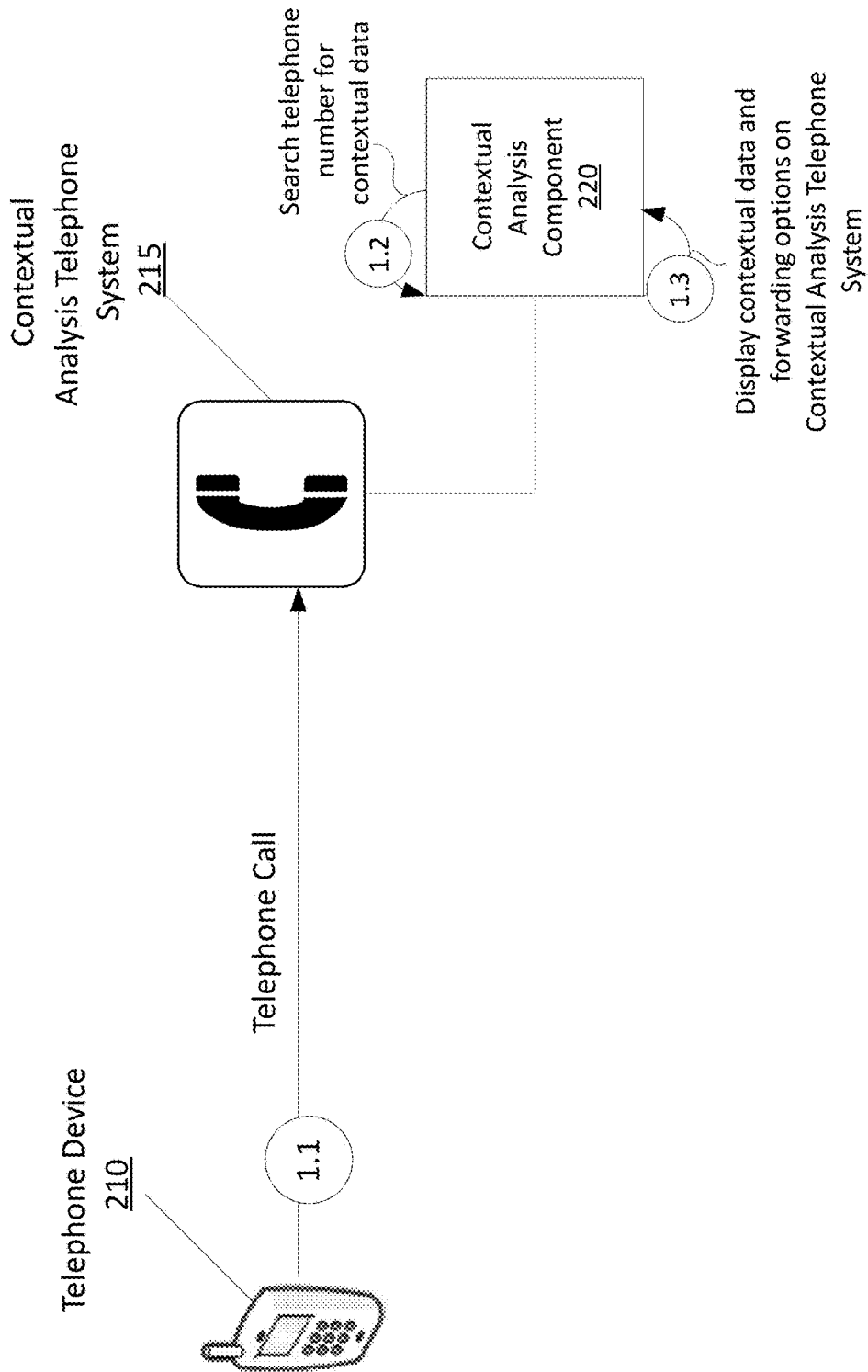
FIG. 4 shows an overview of an example implementation in accordance with aspects of the present invention

FIG. 4 shows an overview of an example implementation in accordance with aspects of the present invention. As shown in FIG. 4, a telephone device 210 may place a telephone call to a contextual analysis telephone system 215 (at step 1.1). At step 1.2, a contextual analysis component 220 of the contextual analysis telephone system 215 may search the telephone number for contextual data. For example, as described herein, the contextual analysis component 220 may search multiple different data sources based on the telephone number to identify a purpose of the call. In embodiments, the contextual analysis component 220 may identify the caller from the telephone number, and may search internal databases for a profile based on the caller and/or the telephone number. For example, if the contextual analysis telephone system 215 is implemented in a customer service environment, the contextual analysis component 220 may search a database having profiles for customers of a service provider. The contextual analysis component 220 may identify a customer profile based on the telephone number and analyze the information in the customer service profile to determine a possible purpose for the call. Additionally, or alternatively, the contextual analysis component 220 may search other sources (e.g., social media pages, etc.) associated with the caller. As an example, the contextual analysis component 220 may identify, from the customer profile, that the customer recently registered a new product with the service provider. The contextual analysis component 220 may further identify, from a social media profile, that the customer is having technical issues with the product (e.g., based on natural language processing techniques and processing of the customer's social media posts that indicate that the customer may be having technical issues with the product). Accordingly, the contextual analysis component 220 may identify that the purpose for the call is to obtain technical assistance.

The contextual analysis component 220 may also identify possible delegates for which to route the call based on the expertise of those delegates in relation to the purpose of the call. For example, the contextual analysis component 220 may identify departments and/or individuals having expertise to provide the technical assistance for the product in question (e.g., based on employee/department profile data indicating expertise areas). In embodiments, the contextual analysis component 220 may score the delegates based on the quality or likelihood that delegate will be best-suited to assist the caller.

At step 1.3, the contextual analysis component 220 may display the contextual data and forwarding options (e.g., a list of suggested delegates for forwarding the call). An operator or user of the contextual analysis telephone system 215 may select to answer the call, or forward the call to a delegate. Additionally, or alternatively, the contextual analysis telephone system 215 may automatically forward the call to a delegate, who may then see the displayed contextual data, and select to forward the call to a different delegate, if desired.

Figure 5:
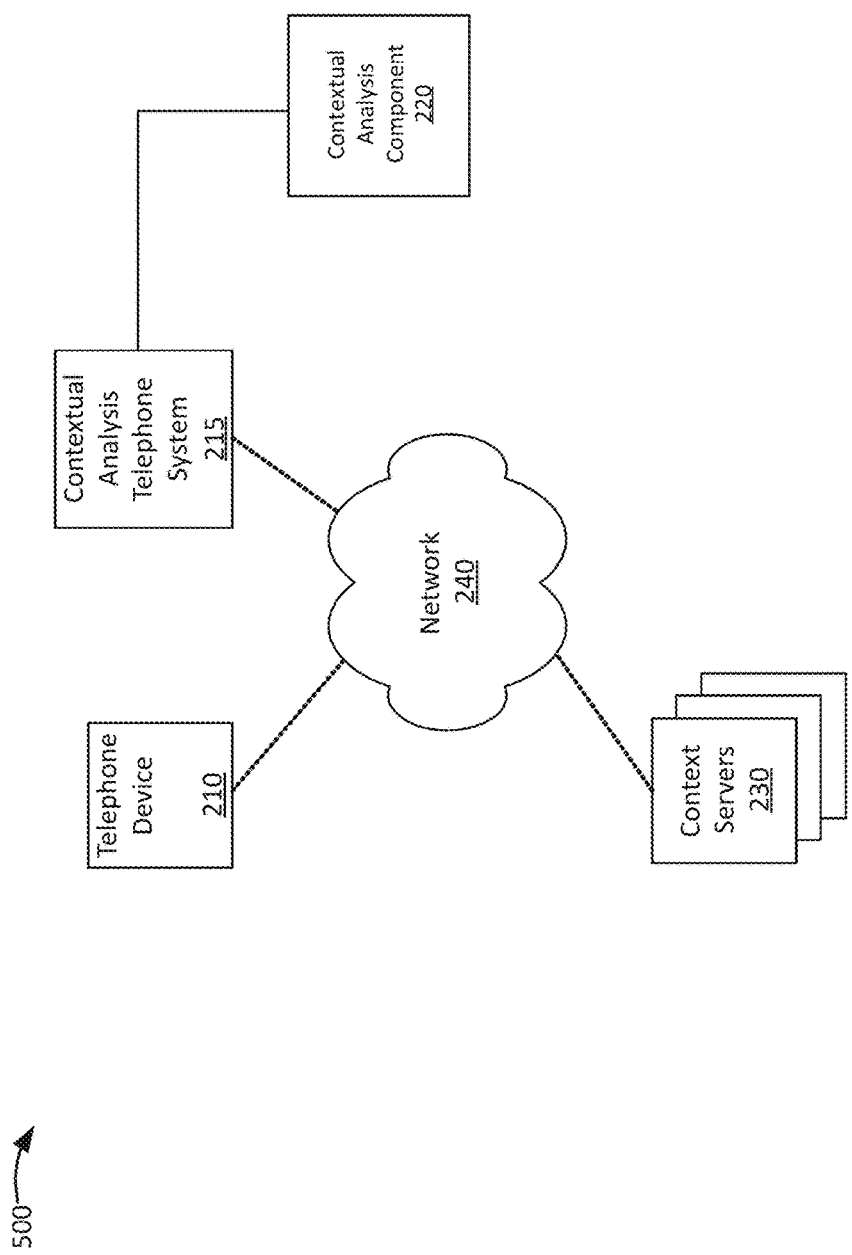
FIG. 5 shows an example environment in accordance with aspects of the present invention.

FIG. 5 shows an example environment in accordance with aspects of the present invention. As shown in FIG. 5, environment 500 may include telephone device 210, a contextual analysis telephone system 215, as content servers 230, and/or network 240. In embodiments, one or more components in environment 500 may correspond to one or more components in the cloud computing environment of FIG. 2. In embodiments, one or more components in environment 500 may include components of computer system/server 12 of FIG. 1.

The telephone device 210 may include a device capable of placing and/or receiving telephone calls, and communicating via a network, such as the network 240. For example, the telephone device 210 may correspond to a mobile communication device (e.g., a smart phone or a personal digital assistant (PDA)), a portable computer device (e.g., a laptop or a tablet computer), a desktop phone, and/or another type of device. In some embodiments, the telephone device may be used to place a call to another telephone device 210 and/or a contextual analysis telephone system 215.

The contextual analysis telephone system 215 may include one or more computing devices (e.g., such as computer system/server 12 of FIG. 1) that implement a contextual analysis component 220 for performing contextual analysis of a telephone call. In embodiments, the contextual analysis telephone system 215 may be a smart phone, desktop phone, laptop, tablet, and/or similar device. Additionally, or alternatively, the contextual analysis telephone system 215 may be associated with a call center/smart switchboard to intelligently forward calls based on contextual analysis. In some scenarios, the telephone device 210 may perform the functions of the contextual analysis telephone system 215, and vice versa.

The content servers 230 may include one or more computing devices (e.g., such as computer system/server 12 of FIG. 1) that store context associated with callers. In embodiments, the contextual analysis telephone system 215 may communicate with the content servers 230 to obtain context information, such as information from social media posts, e-mail/text conversations between an individual and a party associated with the contextual analysis telephone system 215, calendar information associated with a caller, etc.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
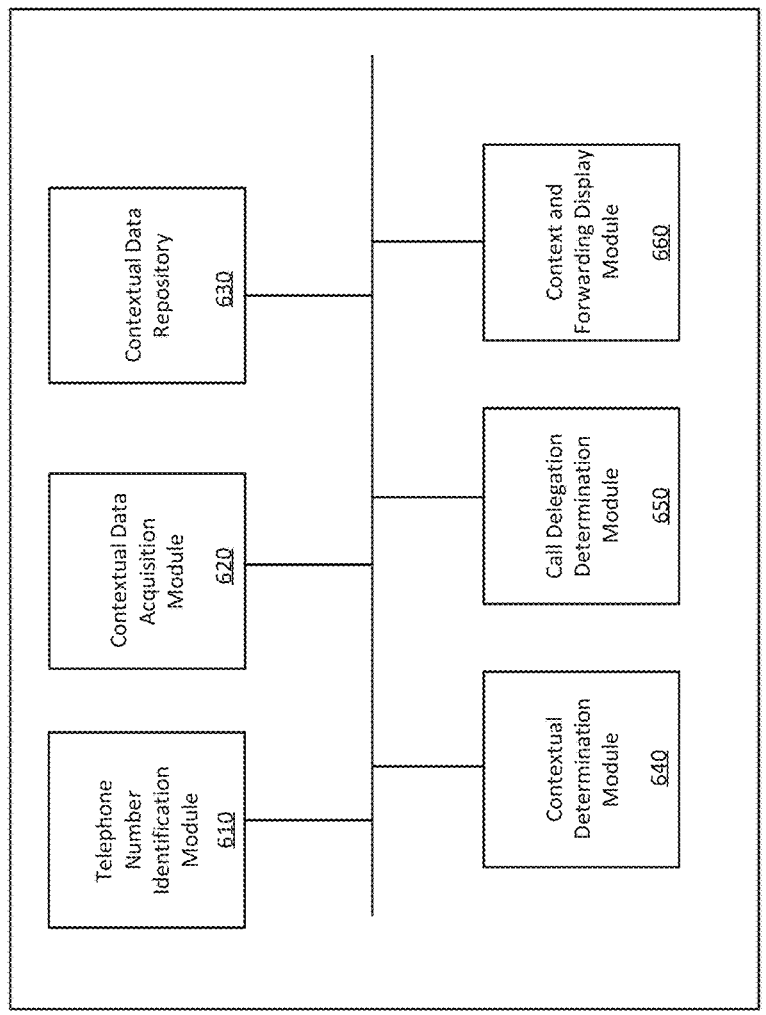
FIG. 6 shows a block diagram of example components of a contextual analysis component in accordance with aspects of the present invention.

FIG. 6 shows a block diagram of example components of a contextual analysis component in accordance with aspects of the present invention. As shown in FIG. 6, the contextual analysis component 220 may include a telephone number identification module 610, a contextual data acquisition module 620, a contextual data repository 630, a contextual determination module 640, a call delegation determination module 650, and a context and forwarding display module 660. In embodiments, the contextual analysis component 220 may include additional or fewer components than those shown in FIG. 6. In embodiments, separate components may be integrated into a single computing component or module. Additionally, or alternatively, a single component may be implemented as multiple computing components or modules.

The telephone number identification module 610 may include a program module (e.g., program module 42 of FIG. 1) that identifies a telephone number from an incoming call. For example, the telephone number identification module 610 may include a caller ID system or application.

The contextual data acquisition module 620 may include a program module (e.g., program module 42 of FIG. 1) that may acquire contextual data from one or more content servers 230. For example, the contextual data acquisition module 620 may acquire data from an individual's social media posts, shared calendar, location sharing application, or the like. In embodiments, the contextual data acquisition module 620 may identify the user based on the telephone number identified by the telephone number identification module 610, and may search for contextual data associated with the identified user. As described herein, the contextual data acquisition module 620 may acquire the contextual data based on receiving an instruction from the contextual determination module 640.

The contextual data repository 630 may include a data storage device (e.g., storage system 34 of FIG. 1) that stores a caller profile having previously acquired contextual data associated with a telephone number. For example, the contextual data repository 630 may store contextual data that was previously acquired from the contextual data acquisition module 620. Additionally, or alternatively, the contextual data repository 630 may store contextual data that is entered by an operator. For example, in a customer-service implementation, an operator of a customer service provider may manually enter a description and/or other data relating to a customer's previous calls (e.g., reason for the call, outcome of the call, etc.). Additionally, or alternatively, the contextual data repository 630 may store information relating to products registered to the customer, customer interests, call history, etc. Additionally, or alternatively, the contextual data repository 630 may store other profile data regarding the caller, such as historical caller location information (e.g., as obtained based on processes described in greater detail below), delegates with whom the caller previously spoke, relationship/reputation between delegates and the caller, etc. As described herein, the caller profile and/or information stored by the contextual data repository 630 may be updated over time as more information regarding the caller is collected. In embodiments, the acquired contextual data and/or the stored contextual data may be in the form of text data and/or audio data (e.g., from audio/video posted on social media, audio from a voicemail, etc.).

The contextual determination module 640 may include a program module (e.g., program module 42 of FIG. 1) that determines context associated with an incoming call. For example, the contextual determination module 640 may determine a possible reason for the call, an urgency of the call, etc. based on contextual information obtained via the contextual data acquisition module 620 and/or from the contextual data repository 630. In embodiments, the contextual determination module 640 may instruct the contextual data acquisition module 620 to obtain contextual data and provide the contextual data to the contextual determination module 640. Additionally, or alternatively, the contextual determination module 640 may instruct the contextual data repository 630 to provide contextual data to the contextual determination module 640. In particular, the contextual determination module 640 may look up a telephone number in the contextual data repository 630 and identify a caller profile associated with the telephone number.

In embodiments, the contextual determination module 640 may determine context of an incoming call based on analyzing the acquired and/or the stored contextual data (e.g., the information in the caller profile). In embodiments, the contextual determination module 640 may use natural language processing techniques on text/audio of contextual data to predict a reason for the call and/or urgency of the call. Additionally, or alternatively, the contextual determination module 640 may use shared location information (e.g., shared through a location sharing application) to identify the reason and/or urgency of the call. For example, the contextual determination module 640 may identify, based on the telephone number, that Person A is calling. Further, contextual determination module 640 may identify that Person A is sharing their location via a location sharing application or service. Accordingly, the contextual determination module 640 may obtain the caller's location via the sharing application/service. Additionally, or alternatively, the contextual determination module 640 may determine that Person A is sharing their location via social media and/or other platform and obtain location information via social media. As described herein, the contextual determination module 640 may factor in the location when determining the context of the incoming call (e.g., the reason for the call and/or the urgency of the call).

As described herein, the contextual determination module 640 may determine multiple reasons for an incoming call, and may score each reason based on a scoring algorithm in which higher scores indicate the more likely reason for the call. The contextual determination module 640 may also weigh different contextual data records with different weights. As an example, the contextual determination module 640 may predict that a reason for an incoming call is to obtain technical support for a product based on a the product being newly registered to the caller and based on a social media post from the caller indicating trouble operating the product (e.g., as determined based on natural language processing techniques). As another example, the contextual determination module 640 may predict that the reason for the call is to schedule an appointment for service of a product (e.g., based on a previous call record, stored by the contextual data repository 630, that the caller had previously inquired about scheduling the service call). As another example, the contextual determination module 640 may predict that the reason for the call is to discuss a billing issue (e.g., based on a previous call record, stored by the contextual data repository 630, that the caller had previously inquired about a billing issue). In embodiments, the contextual determination module 640 may categorize an incoming call based on a determined reason for the call. The categories may be based on the environment in which the contextual analysis telephone system 215 is implemented. For example, for a medical provider, the incoming call may be categorized as "billing," "insurance," "appointment scheduling," "specialist referral," "lab results," etc.

In embodiments, the contextual determination module 640 may score the predicted reason or category indicating a likelihood that the predicted reason is correct. In the scoring, the contextual determination module 640 may more heavily weigh one data record (e.g., product registration information) than another data record (e.g., social media post), or vice versa, as configurable by an administrator or user of the contextual analysis telephone system 215. In embodiments, the scoring may be a numerical value (e.g., on a scale of 0-100) or may be in the form of a description.

In embodiments, the contextual determination module 640 may determine a level of urgency of the call based on the contextual data of an identified caller (e.g., as identified based on the telephone number). As an example, the contextual determination module 640 may determine the urgency based on text from an e-mail/text message between the caller and the recipient (e.g., based on natural language analysis of the text indicating the level of urgency). Additionally, or alternatively, the contextual determination module 640 may determine the urgency based on the location of the caller (e.g., as determined by a location sharing application). For example, the contextual determination module 640 may determine an expected location of the caller based on the caller's prior location history, shared calendar, or the like. The contextual determination module 640 may further determine that the caller is not in the expected location, and may conclude that the call is of relatively high urgency. In embodiments, the contextual determination module 640 may determine a score (e.g., numerical value and/or a description) indicating a level of urgency based on the contextual information. For example, relatively more contextual data indicating that the call is urgent may increase the urgency score. Further, certain contextual data may be weighted higher than others (e.g., location information indicating that the caller's location is at an unexpected location may be weighed higher than natural language processing of a social media post indicating urgency).

The call delegation determination module 650 may include a program module (e.g., program module 42 of FIG. 1) that determines delegates whom which the call may be forwarded. For example, the call delegation determination module 650 may determine the delegates based on previously stored information indicating a level of expertise in a particular subject for which the caller may be calling to discuss (e.g., technical support of a particular product). Additionally, or alternatively, the call delegation determination module 650 may determine the delegates based on departments assigned to handle calls having particular purposes or assigned particular categories (e.g., the call delegation determination module 650 may determine a delegate as a billing department or billing personnel for calls categorized as "billing" calls or relating to billing questions). The call delegation determination module 650 may also score the delegates indicating the likelihood that the delegate is the appropriate party to receive the call.

The context and forwarding display module 660 may include a program module (e.g., program module 42 of FIG. 1) that displays contextual messages (e.g., reason and/or urgency of the incoming call) and delegates who which the call may be forwarded. Additionally, or alternatively, the context and forwarding display module 660 may display a list of predetermined, non-contextual messages that may be sent to a forwarded delegate, explaining why the call is being forwarded (e.g., "I am in a meeting and unavailable to answer this call"). In embodiments, the non-contextual messages may be based on a calendar of the user/operator of the contextual analysis telephone system 215 that received the incoming call. The context and forwarding display module 660 may display the list of contextual messages and the list of delegates in order of score. The context and forwarding display module 660 may receive a selection to forward a call and may forward the call to the delegate along with the contextual messages, non-contextual messages, and/or additional call forwarding options to forward the call to another delegate (e.g., as described in greater detail below with respect to FIGS. 8A and 8B).

Figure 7:
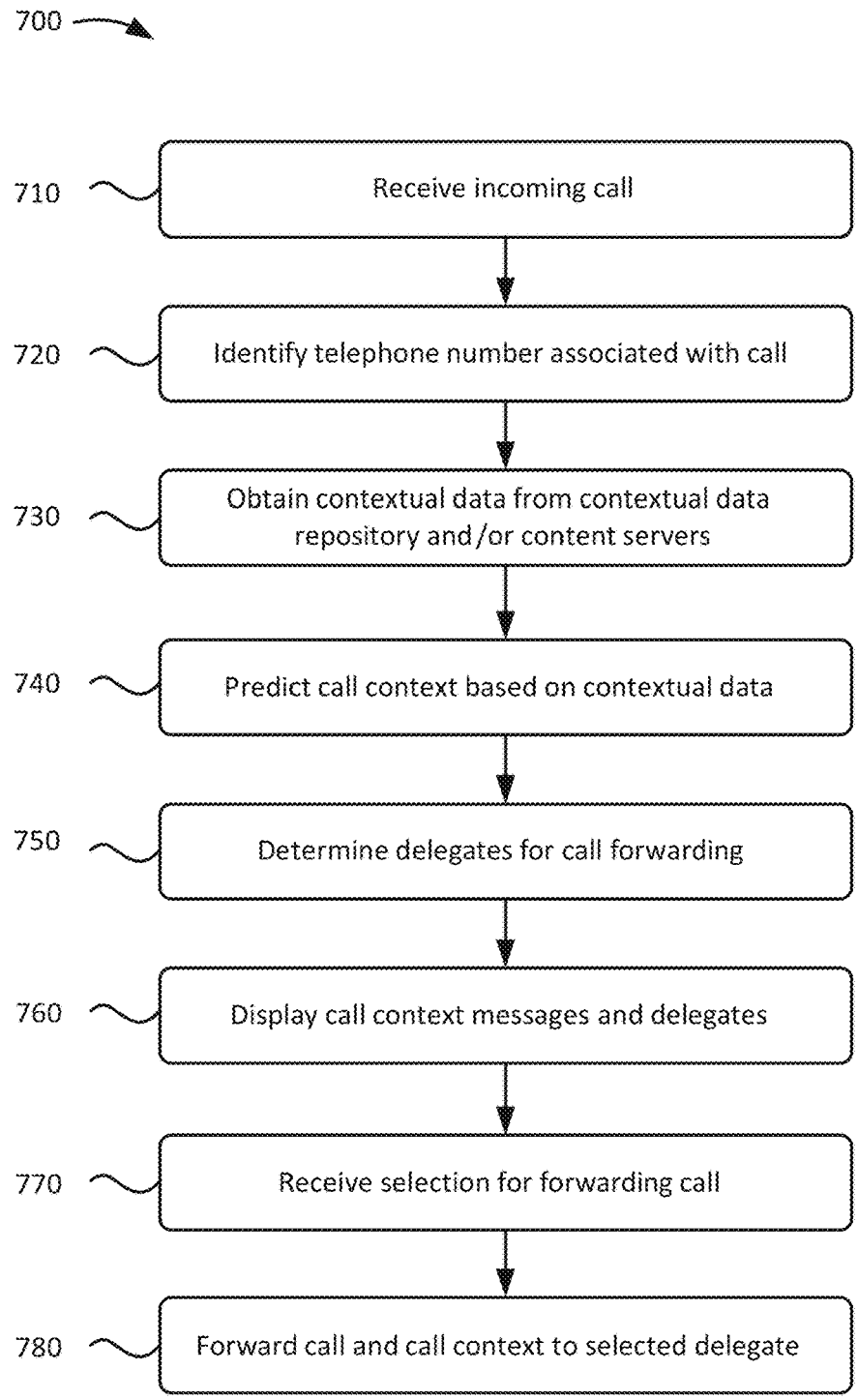
FIG. 7 shows an example flowchart of a process for predicting call context and delegates for call forwarding in accordance with aspects of the present invention.

FIG. 7 shows an example flowchart of a process for predicting call context and delegates for call forwarding in accordance with aspects of the present invention. The steps of FIG. 7 may be implemented in the environment of FIG. 5, for example, and are described using reference numbers of elements depicted in FIGS. 5 and 6. As noted above, the flowchart illustrates the architecture, functionality, and operation of possible implementations of systems, methods, and computer program products according to various embodiments of the present invention.

As shown in FIG. 7, process 700 may include receiving an incoming call (step 710). For example, the contextual analysis telephone system including the contextual analysis component 220 may receive an incoming call from a telephone device 210 associated with a caller. Process 700 may further include identifying a telephone number associated with the call (step 720). For example, as described above with respect to the telephone number identification module 610, the contextual analysis component 220 may identify a telephone number associated with the call.

Process 700 may also include obtaining contextual data from contextual data repository and/or content servers (step 730). For example, as described above with respect to the contextual determination module 640, the contextual analysis component 220 may obtain contextual data from the contextual data repository 630 and/or from content servers 230 via the contextual data acquisition module 620. As described herein, the contextual analysis component 220 may obtain contextual data, such as information from social media posts, e-mail/text message conversations between the recipient and caller, etc. Additionally, or alternatively, the contextual analysis component 220 may obtain location information of the caller from a location sharing application.

Process 700 may further include predicting the call context based on the contextual data (step 740). For example, as described above with respect to the contextual determination module 640, the contextual analysis component 220 may predict the call context (e.g., purpose and/or urgency of the call) based on the contextual data. As an example, the contextual analysis component 220 may predict that a reason for an incoming call is to obtain technical support for a product based on a the product being newly registered to the caller and based on a social media post from the caller indicating trouble operating the product (e.g., as determined based on natural language processing techniques). As another example, the contextual analysis component 220 may predict that the reason for the call is schedule an appointment for service of a product (e.g., based on a previous call record, stored by the contextual data repository 630, that the caller had previously inquired about scheduling the service call). In embodiments, the contextual analysis component 220 may score the predicted reason indicating a likelihood that the predicted reason is correct.

The contextual analysis component 220 may determine an urgency of the call based on the contextual data of an identified caller (e.g., as identified based on the telephone number). As an example, the contextual analysis component 220 may determine the urgency based on text from an e-mail/text message between the caller and the recipient (e.g., based on natural language analysis of the text indicating the level of urgency). Additionally, or alternatively, the contextual analysis component 220 may determine the urgency based on the location of the caller (e.g., as determined by a location sharing application).

Process 700 may also include determining delegates for call forwarding (step 750). For example, as described above with respect to the call delegation determination module 650, the contextual analysis component 220 may determine delegates whom which the call may be forwarded. For example, the contextual analysis component 220 may determine the delegates based on previously stored information indicating a level of expertise in a particular subject for which the caller may be calling to discuss (e.g., technical support of a particular product). The contextual analysis component 220 may also score the delegates indicating the likelihood that the delegate is the appropriate party to receive the call.

Process 700 may further include displaying call context messages and delegates (step 760). For example, as described above with respect to the context and forwarding display module 660, the contextual analysis component 220 may display contextual messages (e.g., reason and/or urgency of the incoming call) and delegates who which the call may be forwarded. Additionally, or alternatively, the context and forwarding display module 660 may display a list of predetermined, non-contextual messages that may be sent to a forwarded delegate, explaining why the call is being forwarded (e.g., "I am in a meeting and unavailable to answer this call").

Process 700 may also include receiving a selection to forward call (step 770) and forwarding the call and call context to selected delegate (step 780). For example, as described above with respect to the context and forwarding display module 660, the contextual analysis component 220 may receive a selection to forward a call and may forward the call to the delegate along with the contextual messages, non-contextual messages, and/or additional call forwarding options to forward the call to another delegate (e.g., as described in greater detail below with respect to FIGS. 8A and 8B)

Figure 8A:
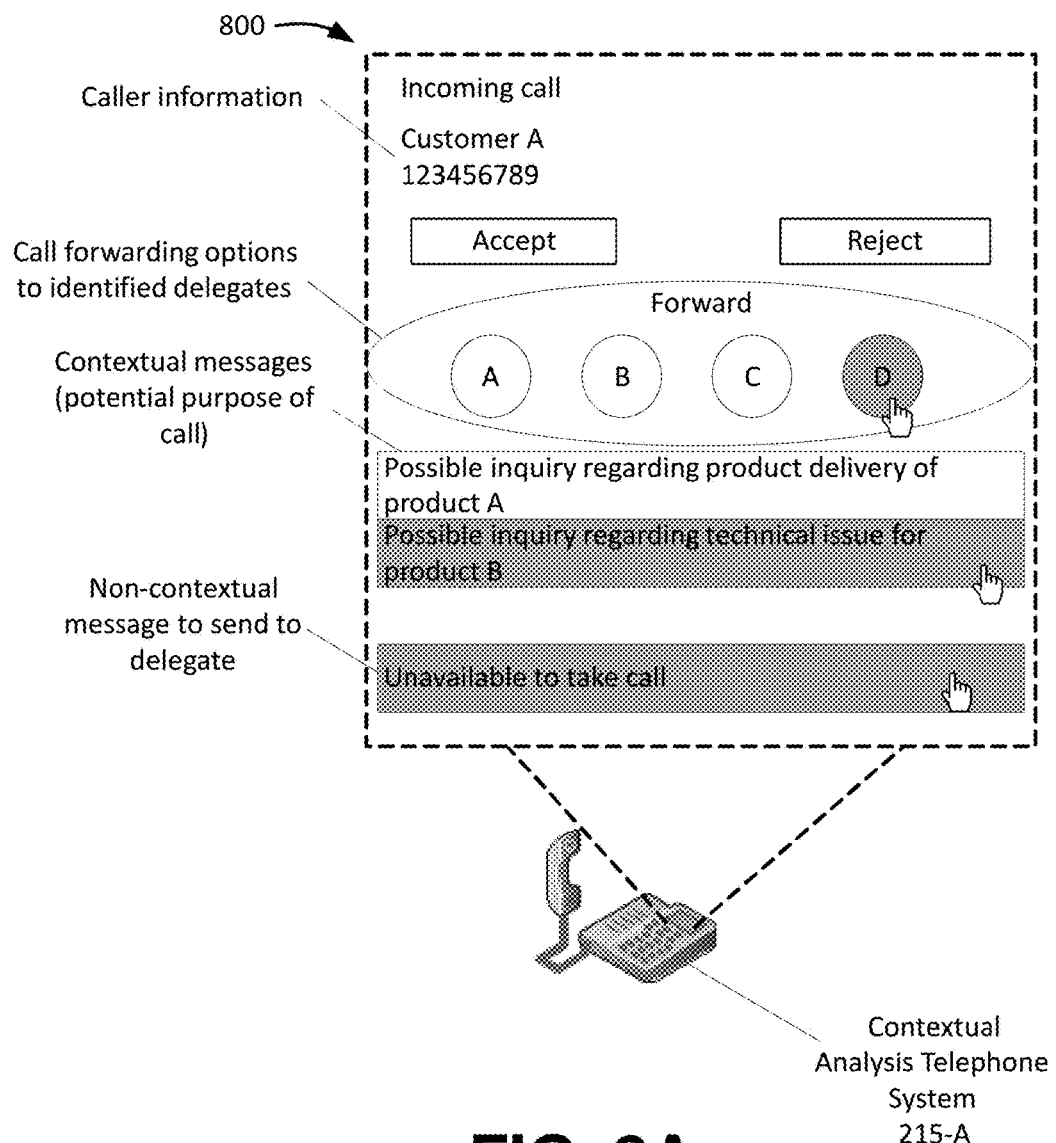
FIGS. 8A and 8B shows an example of displaying a contextual messages for an incoming call and forwarding options to forward the incoming call to a delegate in accordance with aspects of the present invention.
Figure 8B:
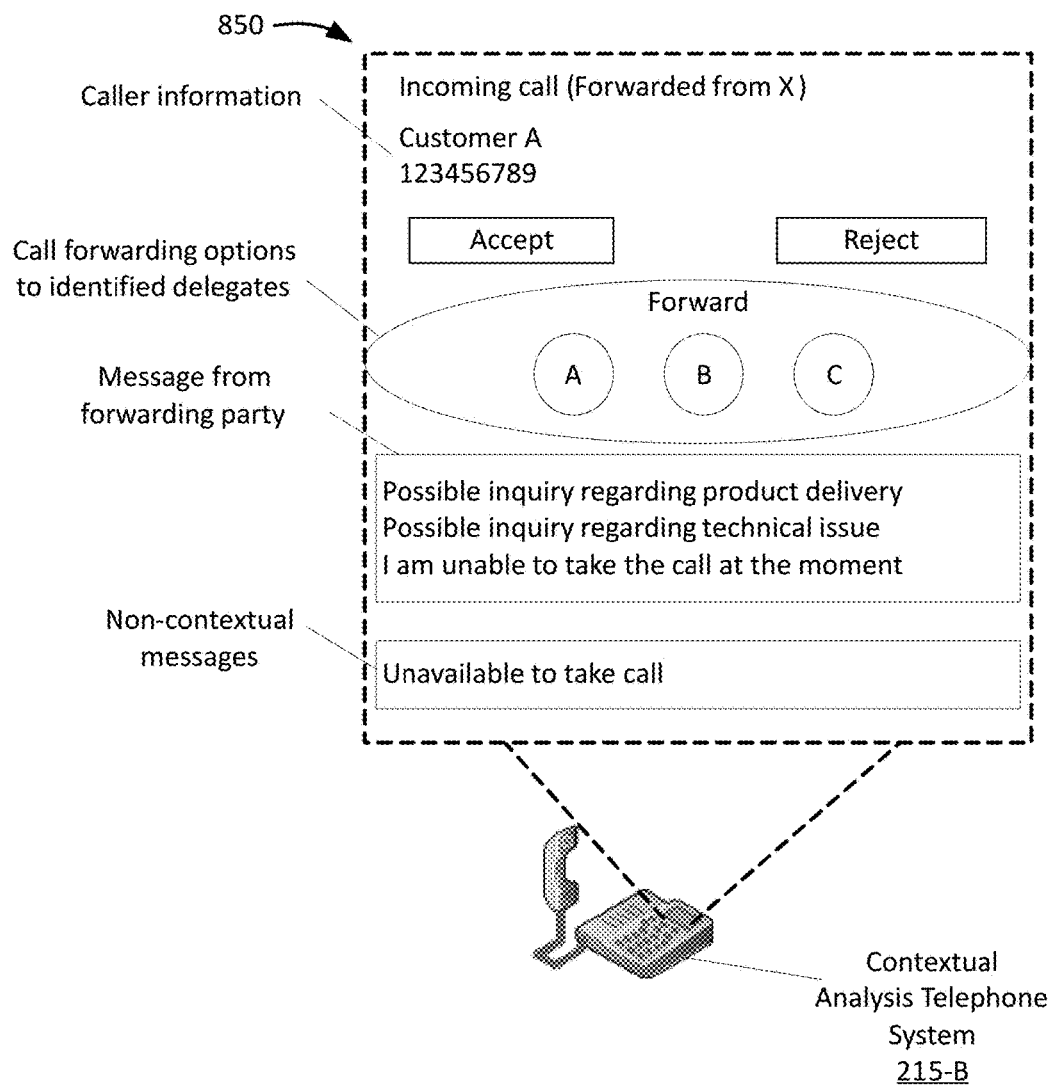

FIGS. 8A and 8B show an example of displaying contextual messages for an incoming call and forwarding options to forward the incoming call to a delegate in accordance with aspects of the present invention. As shown in interface 800, a display of a contextual analysis telephone system 215-A may identify information for a caller (e.g., phone number and name). Interface 800 may further identify a list of delegate options to forward the call as determined in accordance with process 700. Further, interface 800 may display a list of contextual messages and non-contextual messages, as determined in accordance with process 700. Interface 800 may also display options to answer the call or drop the call. In this way, the recipient may be better prepared to answer the call based on knowledge gained from the contextual messages, and may more accurately forward the call to the appropriate delegate based on the possible purpose of the call. In embodiments, the contextual analysis telephone system 215-A may generate the information/objects in the interface based on receiving an incoming call, identifying the telephone number associated with the call, obtaining contextual data based on the telephone number, predicting the call context based on the contextual data, and determining delegates in accordance with process 700 as described above with respect to FIG. 7. In embodiments, the contextual analysis telephone system 215-A may receive, via interface 800, a selection to forward the call to a delegate and a selection of a non-contextual message. In the example of FIG. 8A, the user selects to forward the call to delegate "D."

Continuing with the above example, and referring to FIG. 8B, a contextual analysis telephone system 215-B (associated with the delegate to whom the call was forwarded) may receive the call. As shown in interface 850, the contextual analysis telephone system 215-B may identify the caller information, options to accept, reject, or forward the call to delegate, contextual messages, and non-contextual messages from the forwarding party (e.g., the original recipient of the call). In this way, the delegate may be better prepared to answer the call based on knowledge gained from the contextual messages.

Figure 9:
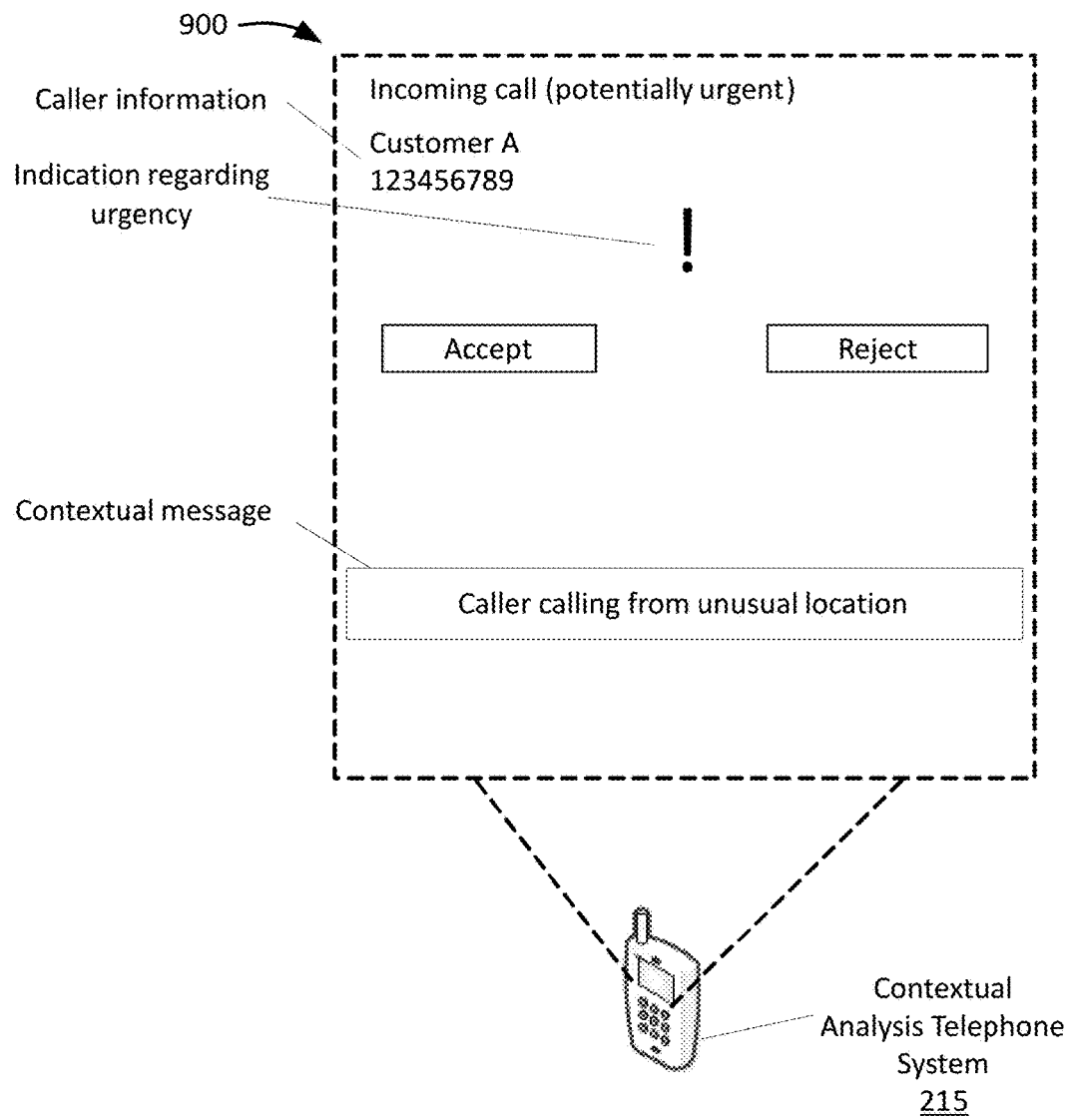
FIG. 9 shows an example for receiving a call with a contextual message indicating the urgency of the call in accordance with aspects of the present invention.

FIG. 9 shows an example for receiving a call with a contextual message indicating the urgency of the call. In the example of FIG. 9, a contextual analysis telephone system 215 may receive a call, identify a telephone number and caller associated with the call, and identify a location of the caller from a location sharing platform. The contextual analysis telephone system 215 may also determine that the location of the caller is inconsistent with an expected location of the caller (e.g., based on a shared calendar of the caller, historical location information for the caller, etc.). Accordingly, the contextual analysis telephone system 215 may determine that the caller is calling from an unexpected location, hence, the call may be considered to be urgent.

As shown in interface 900 of FIG. 9, a contextual analysis telephone system 215 may display information regarding an incoming call (e.g., a telephone number and a caller). The contextual analysis telephone system 215 may also display an indication regarding the urgency of the call (e.g., by a particular icon, character, etc.). Additionally, or alternatively, the contextual analysis telephone system 215 may display a numerical value/description (e.g., low, medium, high) indicating the level of urgency. The contextual analysis telephone system 215 may also display a contextual message indicating that the caller is calling from an unusual location. In this way, the recipient of the caller (e.g., the user of the contextual analysis telephone system 215) may be aware that the call is urgent and give appropriate attention to the call. In embodiments, the caller's location may be displayed on the contextual analysis telephone system 215.

In embodiments, the contextual analysis telephone system 215 may override notification settings for calls that the contextual analysis telephone system 215 determines to be urgent. For example, the contextual analysis telephone system 215 may override a silent notification setting by providing an audio notification when an urgent call is received. Additionally, or alternatively, the contextual analysis telephone system 215 may only override a silent notification setting when the level of urgency satisfies a threshold. In embodiments, the contextual analysis telephone system 215 may determine that a call is urgent further based on a location of the caller. For example, the contextual analysis telephone system 215 may determine that a call is urgent when the caller's location is at an emergency facility (e.g., hospital, police station, etc.) and when the caller is not typically at the emergency facility. Additionally, or alternatively, the contextual analysis telephone system 215 may determine the reason and/or urgency for the call based on directory information associated with a location. For example, the contextual analysis telephone system 215 may identify the caller based on their telephone number, obtain the location of the caller (e.g., from a location sharing application, social media platform, etc.), and identify that the caller's location corresponds to a restaurant or bar. Based on determining the caller's location, the contextual analysis telephone system 215 may determine that a purpose for the call may be to request transportation from the caller's location.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computing device, an incoming telephone call from a caller;
identifying, by the computing device, a telephone number associated with the telephone call;
determining an identity of the caller based on the telephone number; and
using the identity of the caller to identify the location of the identified caller from a location sharing system;
predicting, by the computing device, one or more reasons for the telephone call based on the location of the identified caller; and
displaying, by the computing device, the one or more reasons for the telephone call.

2. The method of claim 1, further comprising:
determining a delegate based on the one or more reasons for the telephone call; and
displaying an option to forward the telephone call to the delegate.

3. The method of claim 2, further comprising:
receiving a selection to forward the telephone call to the delegate;
forwarding the telephone call to a smart telephone system associated with the delegate;
providing the smart telephone system associated with the delegate with information regarding the one or more reasons for the telephone call.

4. The method of claim 1, further comprising obtaining contextual data, wherein the obtaining the contextual data comprises:
   searching a database for the telephone number; and
   identifying a caller profile associated with the telephone number, wherein the caller profile indicates at least one selected from the group consisting of:
      reasons for calls previously made by the caller;
      products registered to caller;
      caller interests;
      caller historical location;
      caller reputation or relationship with a delegate;
      text or e-mail conversations with the caller; and
      voicemails,
         wherein the predicting the one or more reasons for the telephone call is further based on the contextual data.

5. The method of claim 4, wherein the obtaining the contextual data further comprises:
   identifying an identity of the caller based on the telephone number; and
   searching one or more external servers for information regarding the identified caller.

6. The method of claim 5, wherein the searching the one or more external servers includes searching at least one selected from the group consisting of:
   a social media system; and
   a calendar system.

7. The method of claim 1, further comprising determining an urgency of the telephone call based on the determined location of the identified caller.

8. The method of claim 7, wherein the determining the urgency of call comprises:
   determining an expected location of the identified caller; and
   comparing the expected location with the identified location.

9. The method of claim 1, wherein a service provider at least one of creates, maintains, deploys and supports the computing device.

10. The method of claim 1, wherein the receiving the incoming call, the identifying the telephone number, the determining the identity of the caller, the identifying the location of the identified caller, the predicting the one or more reasons, and the displaying the one or more reasons are provided by a service provider on a subscription, advertising, and/or fee basis.

11. The method of claim 1, wherein the computing device includes software provided as a service in a cloud environment.

12. The method of claim 1, further comprising deploying a system for providing a recipient of the incoming telephone call with advance notice regarding the one or more reasons for the incoming telephone call, comprising providing a computer infrastructure operable to perform the receiving the incoming call, the identifying the telephone number, the determining the identity of the caller, the identifying the location of the identified caller, the predicting the one or more reasons, and the displaying the one or more reasons.

13. A computer program product for providing a recipient of an incoming telephone call with advance notice regarding an urgency of the incoming telephone call, the computer program product comprising a computer readable storage medium having program instructions embodied therewith, the program instructions executable by a computing device to cause the computing device to:
   receive the incoming telephone call from a caller;
   identify a telephone number associated with the telephone call;
   determine an identity of the caller based on the telephone number; and
   use the identity of the caller to identify the location of the identified caller from a location sharing system;
   determine a level of urgency of the telephone call by comparing the identified location of the caller with an expected location of the caller; and
   display information regarding the level of urgency of the telephone call.

14. The computer program product of claim 13, wherein the program instructions further cause the computing device to:
   determine a numerical value or description associated with the level of urgency; and
   display the numerical value or description associated with the level of urgency.

15. The computer program product of claim 13, wherein the program instructions further cause the computing device to:
   determine one or more reasons for the telephone call based on the obtaining the location of the identified caller; and
   display the one or more reasons for the telephone call.

16. The computer program product of claim 15, wherein the program instructions further cause the computing device to obtain contextual data, wherein the obtaining the contextual data comprises:
   searching a database for the telephone number; and
   identifying a caller profile associated with the telephone number, wherein the caller profile indicates at least one selected from the group consisting of:
      reasons for calls previously made by the caller;
      products registered to caller;
      caller interests;
      caller historical location;
      caller reputation or relationship with a delegate;
      text or e-mail conversations with the caller; and
      voicemails,
         wherein the determining the one or more reasons for the telephone call is further based on the contextual data.

17. The computer program product of claim 15, wherein the program instructions further cause the computing device to:
   score each of the one or more reasons for the telephone call; and
   display the score for each of the one or more reasons.

18. The computer program product of claim 13, wherein the program instructions further cause the computing device to override a current notification setting for the telephone call based on the level of urgency of the call.

19. A system comprising:
   a processor, a computer readable memory and a computer readable storage medium associated with a computing device;
   program instructions to receive an incoming telephone call from a caller;
   program instructions to identify a telephone number associated with the telephone call;
   program instructions to determine an identity of the caller based on the telephone number;
   program instructions to use the identity of the caller to identify the location of the identified caller from a location sharing system, program instructions to determine one or more reasons for the telephone call based on the location of the identifies called;

program instructions to determine an urgency of the incoming telephone call by comparing the identified location of the caller with an expected location of the caller;

program instructions to determine a delegate; and program instructions to display the one or more reasons for the incoming telephone call, the urgency of the incoming telephone call, and an option to forward the incoming telephone call to the delegate, wherein the processor instructions are stored on the computer readable storage medium for execution by the CPU via the computer readable memory.

20. The system of claim 19, wherein the one or more reasons for the incoming telephone call and the urgency of the incoming telephone call are based on a location of a caller associated with the incoming telephone call.

* * * * *